United States Patent [19]

Loup

[11] Patent Number: 4,554,940
[45] Date of Patent: Nov. 26, 1985

[54] PRESSURE REDUCING AND REGULATING VALVE

[75] Inventor: Ronald L. Loup, Clarkson, Mich.

[73] Assignee: Koomey, Inc., Brookshire, Tex.

[21] Appl. No.: 531,302

[22] Filed: Sep. 9, 1983

Related U.S. Application Data

[63] Continuation-in-part of Ser. No. 339,554, Jan. 15, 1982, Pat. No. 4,444,216.

[51] Int. Cl.[4] .................... F16K 3/18; G05D 16/00
[52] U.S. Cl. ............................ 137/116; 137/625.38; 251/325
[58] Field of Search .................. 251/325, 367; 137/625.48, 625.33, 625.37, 625.38, 596, 596.14, 596.15, 596.16, 596.17, 596.18, 102, 107, 115, 116, 884, 629, 630.12

[56] References Cited

U.S. PATENT DOCUMENTS

| | | | |
|---|---|---|---|
| 2,311,987 | 2/1943 | Jackson | 137/596 |
| 3,018,796 | 1/1962 | Loup | 137/625.12 |
| 3,022,794 | 2/1962 | Pippenger | 137/116.3 |
| 3,298,384 | 1/1967 | Payne | 137/102 |
| 3,384,122 | 5/1968 | Harpman | 251/367 |
| 3,917,220 | 11/1975 | Gilmore | 251/86 |

Primary Examiner—Martin P. Schwadron
Assistant Examiner—James R. Shay
Attorney, Agent, or Firm—Fulbright & Jaworski

[57] ABSTRACT

A pressure reducing and regulating valve which is operated to move a seal container between an inlet, outlet and vent port in response to fluid pressure. One feature allows the valve to be mounted on a subplate in which both the inlet pressure and the outlet pressure pass through a porting plate which provides a hold down force to compensate for the forces acting to separate the porting plate from the subplate mounting and thus prevent seal extrusion. Another feature of the present invention is the provision of force flow compensating holes which reduce hammering or chattering of the regulating valve.

9 Claims, 13 Drawing Figures

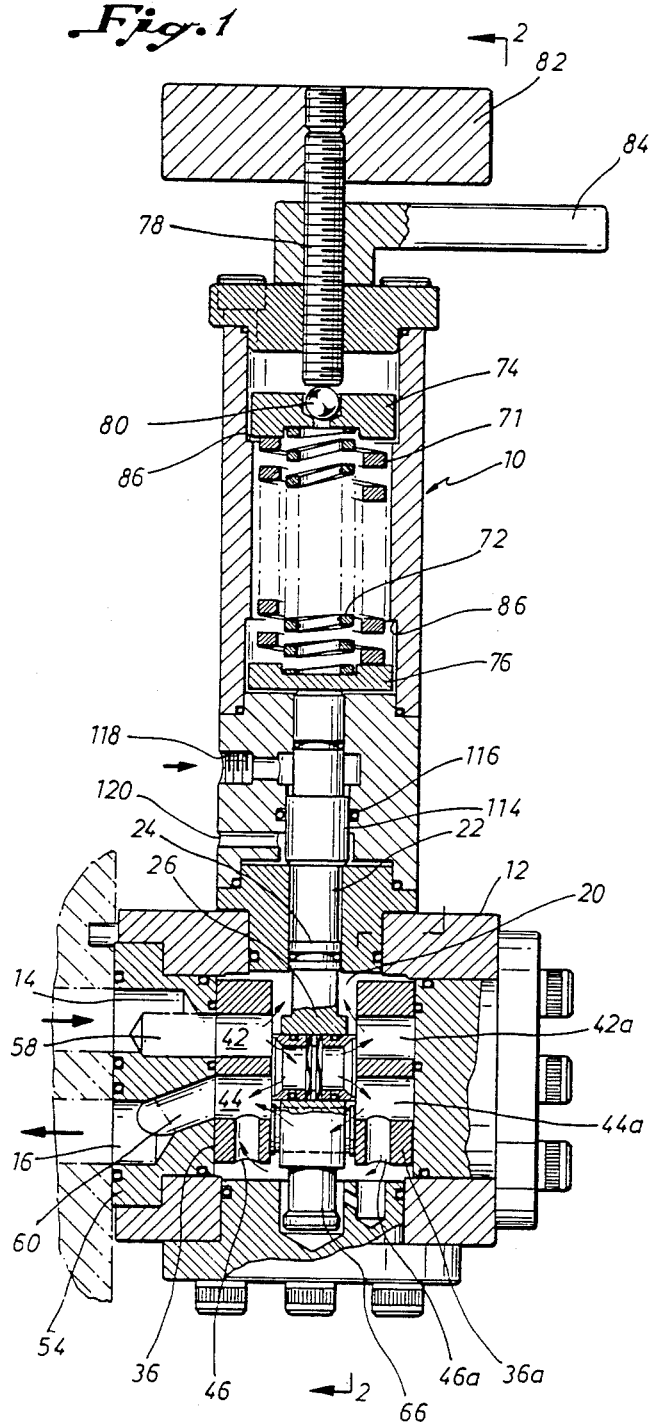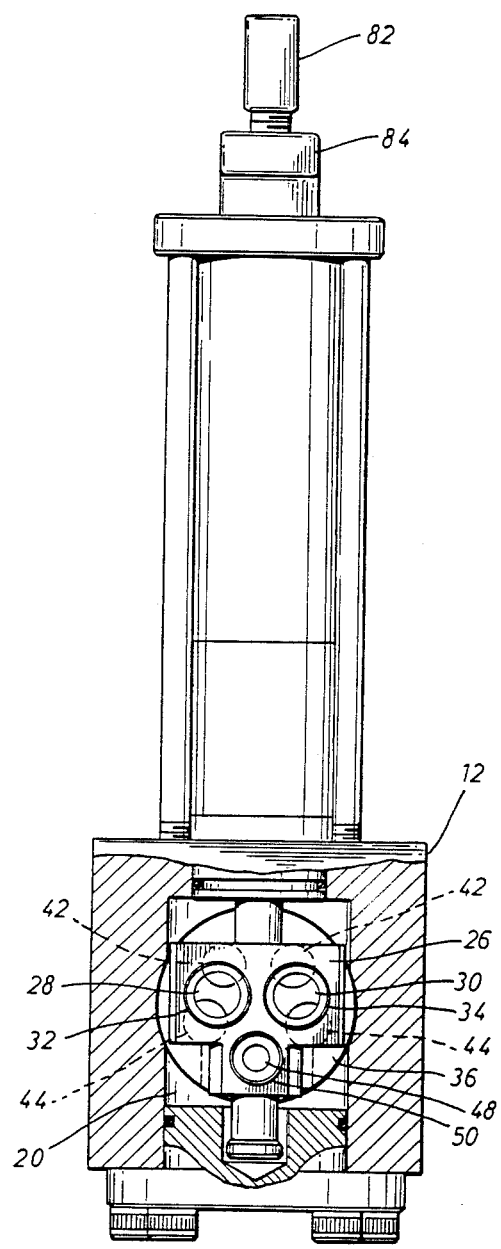

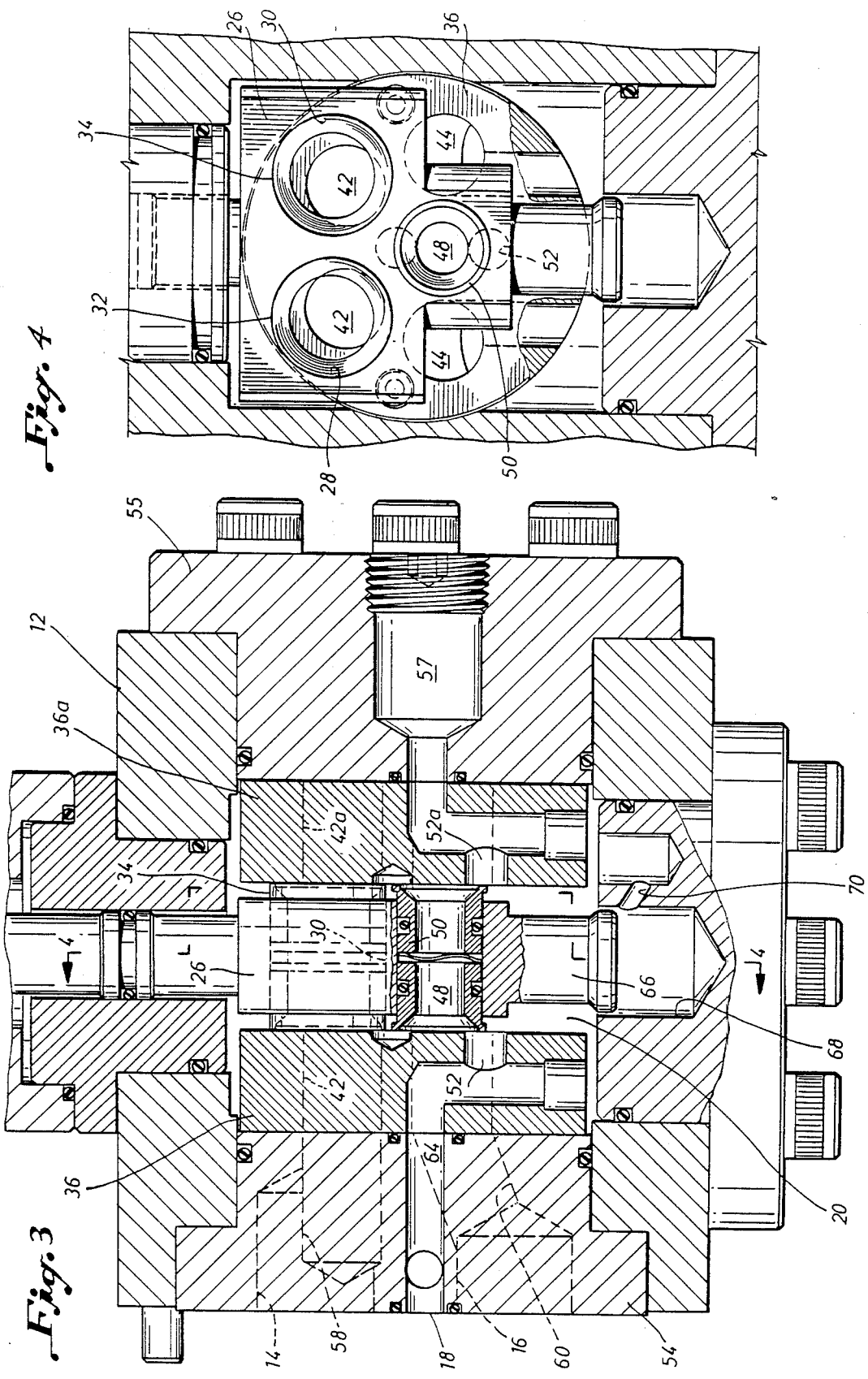

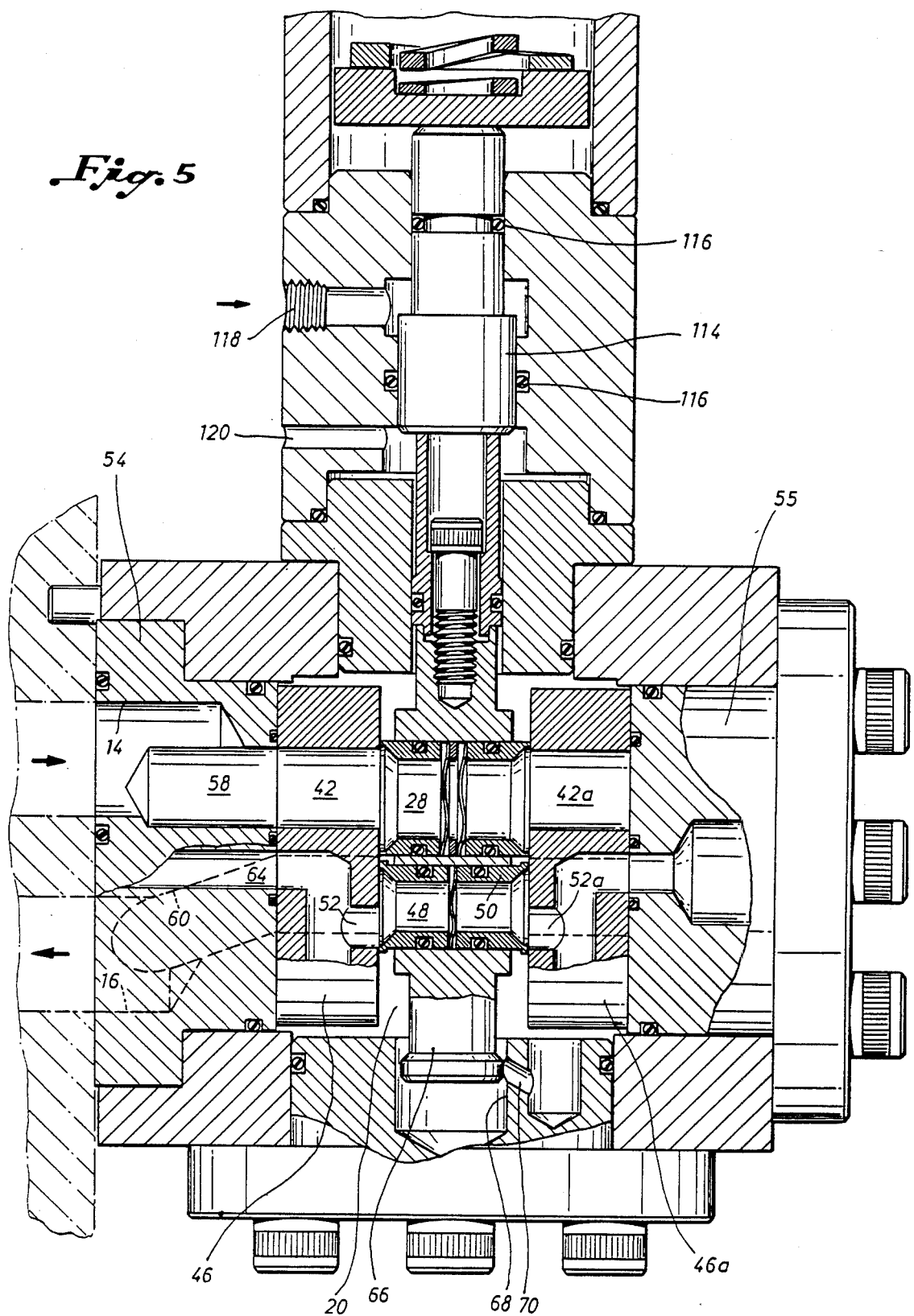

PRESSURE REDUCING AND REGULATING VALVE

CROSS-REFERENCE TO RELATED APPLICATIONS

This application is a continuation-in-part of application Ser. No. 06/339,554, filed Jan. 15, 1982, entitled Pressure Reducing and Regulating Valve, now U.S. Pat. No. 4,444,216.

BACKGROUND OF THE INVENTION

It is known, as shown in U.S. Pat. No. 3,917,220, to provide a pressure reducing and regulating valve which is operated to move a seal container between an inlet, an outlet, and vent port in response to fluid pressure. However, the pressures in the valve cavity act to expand the valve body causing leakage. It is desirable to mount valves on a subplate by bolts wherein the valve utilizes face seals to prevent leakage. A pressure reducing and regulating valve using face seals and which is subplate mounted is shown in U.S. Pat. No. 3,018,796. However, face seals are subject to extrusion when high pressure causes port plate separation at the subplate interface. One feature of the present invention is directed to an improved pressure reducing and regulating valve, which is subplate mounted and in which both the inlet pressure and the outlet pressure pass through a porting plate which provides a hold down force to compensate for the forces acting to separate the porting plate from the subplate mounting thus preventing seal extrusion. Another feature is the provision of flow force compensating holes for preventing hammering or chattering of regulating valves.

SUMMARY

The present invention is directed to a pressure reducing and regulating valve having a body cavity, a plunger having a piston movable in the body and connected to a seal container having a plurality of openings having seals therein, and an inlet, outlet, and vent port connected to the body in which the body has a porting plate having a flat face for mounting to a subplate in which the body is connected to the subplate by bolts. The porting plate includes the inlet and outlet port which communicates between the subplate and the body cavity. A gland seal is provided between the porting plate and the body for preventing leakage even in the event of movement between the porting plate and the body. Face seals are positioned about each of the inlet and outlet ports for mating with the subplate whereby the force of the inlet and outlet pressure acting to separate the port plate from the subplate is compensated by the force of the inlet and outlet pressure in the body cavity acting in a direction to hold the port plate on the subplate.

A still further object of the present invention is wherein the area of the port plate acted upon by the force created by the outlet pressure to separate the port plate from the subplate is less than the area of the port plate acted upon by the force created by the outlet pressure in the body cavity to hold the port plate on the subplate.

Still a further object of the present invention is the provision of a pressure reducing regulating valve with a body having a body cavity, a plunger movable in the body, a piston connected to the plunger and exposed to pressure in the cavity, and a seal container connected to the piston and movable in the body cavity. The container includes first, second and third openings therethrough having first, second and third circular sliding seals. A flow plate is positioned in the body adjacent the seal container. The flow plate includes first, and second inlet ports for communicating with the body cavity but are closed when the first and second openings in the container are aligned with the inlet ports. The flow plate also includes first and second outlet ports communicating with the body cavity and communicable with the first and second inlet ports, respectively, when the first and second openings are moved to overlap both the inlet and outlet ports. The flow plate also includes a vent port in communication with the body cavity which is closed when the third opening in the container is aligned with the vent port. A porting plate having a first side is connected to the flow plate. The first side has first and second inlet passageways connected to the first and second inlet ports of the flow plate, and the first side has first and second outlet passageways connected respectively to the first and second outlet ports of the flow plate. A second side of the porting plate has a single inlet port connected to both of the first and second inlet passageways and has a single outlet port connected to both of the first and second outlet passageways. The second side of the porting plate has a face for mounting to a subplate. Face seals are provided around the single inlet port and the single outlet port for mating with the subplate whereby the force of the inlet and outlet pressure acting to separate the port plate from the subplate is compensated by the force of the inlet and outlet pressure in the body cavity acting against the flow plate and port plate to hold the port plate on the subplate.

A further object of the present invention is the provision of at least one hole adjacent the inlet port which is positioned to provide communication through the hole between the inlet port (high pressure) and the outlet port (low pressure) before the seal opens the inlet port and is also positioned to stop communication through the hole as the seal opens the inlet port thereby reducing the effects of valve hammering.

Still a further object is the provision of at least one second hole positioned to provide communication through the second hole between the body inlet port and the outlet port before the seal communicates with the outlet port and positioned to stop communication through the second hole as the seal communicates with the outlet port for further reducing the effects of hammering.

BRIEF DESCRIPTION OF THE DRAWINGS

FIG. 1 is an elevational view, partly in cross section, of the valve of the present invention shown in the full open position, FIG. 2 is a cross-sectional view taken along the line 2—2 of FIG. 1, FIG. 3 is an enlarged fragmentary elevational view, partly in cross section, of the valve of the present invention shown in the vented position, FIG. 4 is a cross-sectional view taken along the line 4—4 of FIG. 3, FIG. 5 is an enlarged fragmentary elevational view, partly in cross section, showing the valve of the present invention in the fully closed position.

DESCRIPTION OF THE PREFERRED EMBODIMENT

Figures 6, 7:
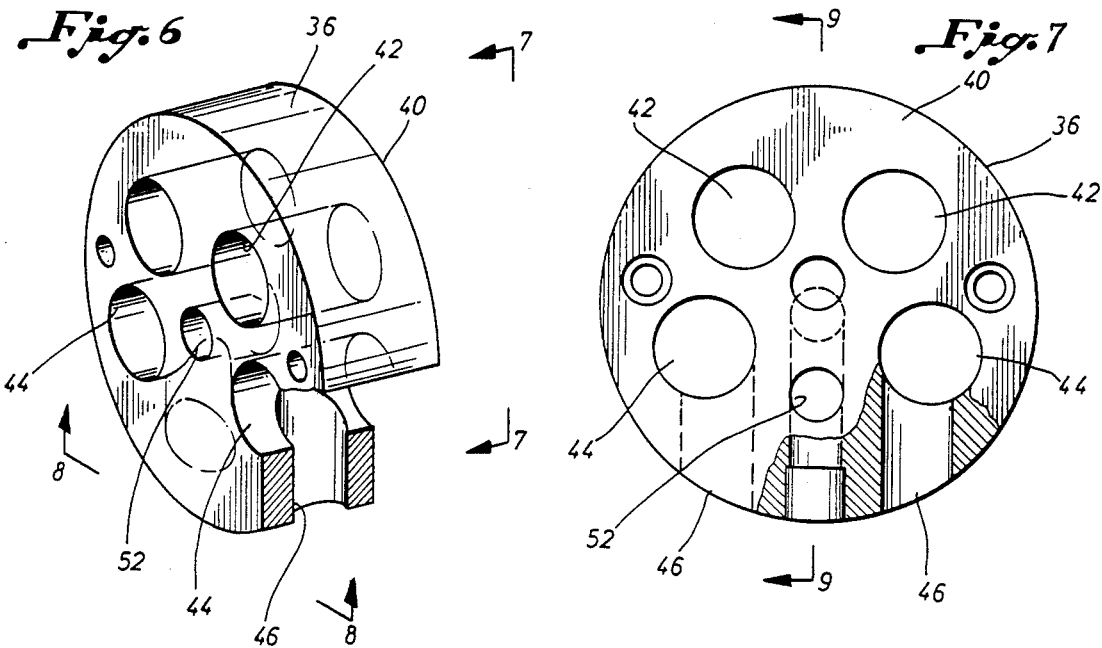
FIG. 6 is an enlarged perspective view, partly broken away, of one of the flow plates in the valve.
FIG. 7 is a view taken along the line 7—7 of FIG. 6.
Figure 8:
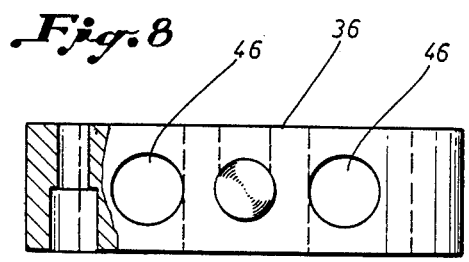
FIG. 8 is a view taken along the line 8—8 of FIG. 6.
Figure 9:
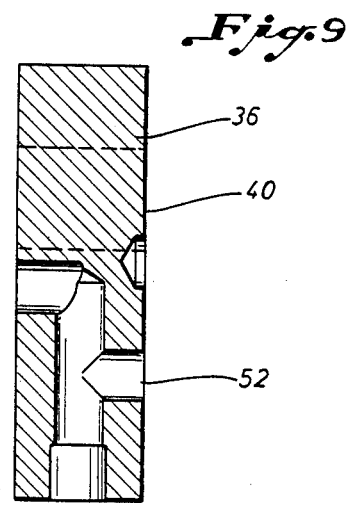
FIG. 9 is a cross-sectional view taken along the line 9—9 of FIG. 7.
Figures 10, 11:
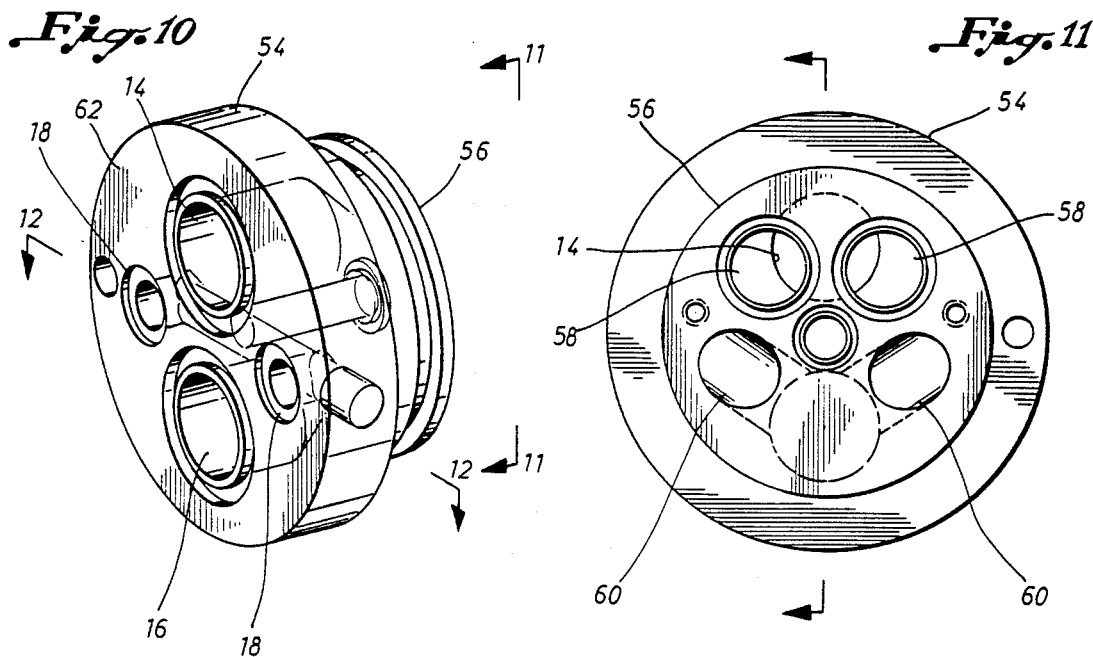
FIG. 10 is a perspective view of the porting plate of the present valve.
FIG. 11 is a view taken along the line 11—11 of FIG. 10.
Figure 12:
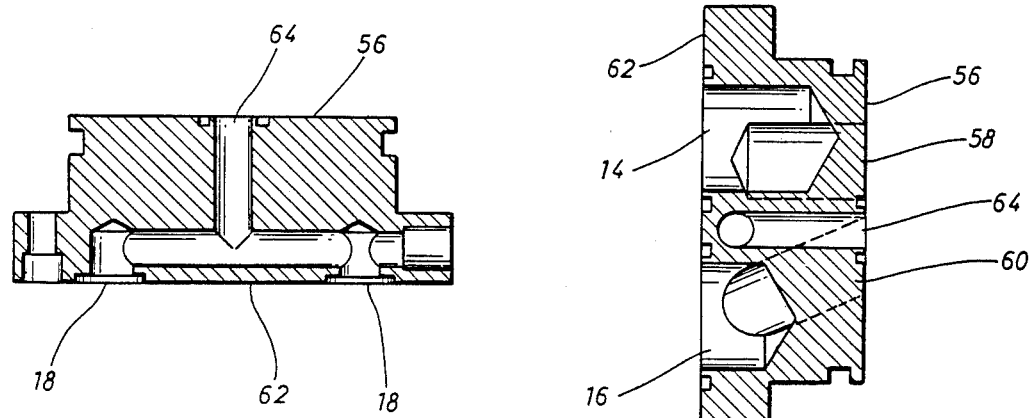
FIG. 12 is a cross-sectional view taken along the line 12—12 of FIG. 10.
Figure 13:
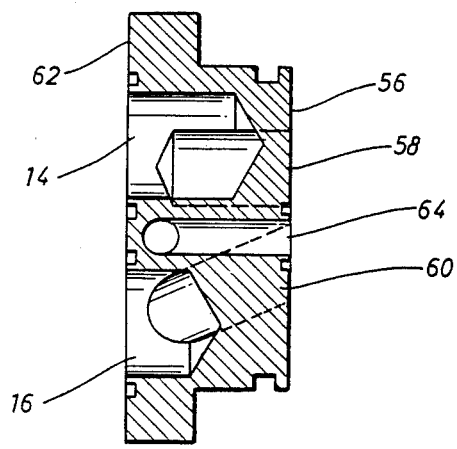
FIG. 13 is a cross-sectional view taken along the line 13—13 of FIG. 11.

Referring now to the drawings, and particularly to FIG. 1, the reference numeral 10 generally indicates the pressure reducing and regulating valve of the present invention which generally includes a body 12 having a fluid inlet 14, fluid outlet 16 and a vent 18. Generally, a hydraulic pressure supply source is connected to the inlet 14 and the hydraulic pressure is supplied at the outlet which is reduced and regulated. The body 12 has a body cavity 20, a plunger 22 movable in the body and a piston 24 connected to the plunger 22 and exposed to the pressure in the body cavity 20.

Referring to FIG. 2, a seal container 26 is connected to the piston and movable in the body cavity 20. The seal container 26 includes one or more openings, such as first and second openings 28 and 30 which are preferably parallel to each other on opposite sides of the vertical axis of the container 26. First and second circular sliding seals 32 and 34 are positioned in the openings 28 and 30, respectively. The sliding seals 28 and 20 are conventional type hydra seat seals having two tubular members which are spring loaded outwardly to sealingly engage a first flow plate 36 and preferably also a second flow plate 36a which are positioned in the body 12 on opposite sides of the seal container 26.

The flow plates 36 and 36a are preferably identical, and are best seen in FIGS. 6–9 in which a single flow plate 36 is best seen. The flow plate 36 has a face 40 which engages the sliding seals 32 and 34 and includes one or more inlet ports such as first and second inlet ports 42 (plate 36a includes ports 42a) therethrough which communicate with the body cavity 20, but as best seen in FIGS. 3, 4 and 5, are closed when the first and second openings 28 and 30 of the seal container 26 are aligned with the inlet ports 42 and 42a and sealed off by the sliding seals 32 and 34.

Each of the flow plates 36 and 36a includes one or more outlet ports such as first and second outlet ports 44 and 44a, respectively, communicating with the body cavity 20 and also communicating with the first and second inlet ports 42 and 42a when the first and second openings 28 and 30 are moved to overlap both the inlet ports 42, 42a and the outlet ports 44, 44a as best seen in FIGS. 1 and 2. It is to be particularly noted that the present structure increases the flow paths between the inlet port 14 and the outlet port 16 as the incoming fluid flows not only from ports 42 through the openings 28 and 30 and into ports 42a and 44a and into the body cavity 20 for returning to the ports 44, and in addition flows out of the ports 42 directly into the body cavity 20 and around the seal container 26 for entering the ports 44. Another advantage of this structure is that this maximizing of flow from the inlet 14 to the outlet 16 may be made with a short stroke or smaller amount of travel of this seal container 26 than with conventional valves.

In order to further maximize the flow, each of the flow plates 36 and 36a includes a passageway 46 and 46a, respectively, connected between each of the first and second outlet ports 44 and 44a, respectively, and the body cavity 20 for further maximizing fluid flow between the inlet ports 42 and the outlet ports 44.

Referring now to FIGS. 3–9, the container 26 includes a third opening 48 therethrough and a third circular sliding seal 50 in the third opening 48. Each of the flow plates 36 and 36a includes a vent port 52 in communication with the body cavity 20 which is closed when the third opening 48 is aligned with the vent ports 52 and 52a, as best seen in FIG. 5. However, as best seen in FIGS. 3 and 4, the seal container 26 has moved upwardly and the sliding seal 50 has uncovered the vent ports 52 and 52a allowing venting of fluid pressure from the body cavity 20 through the vent port 52 directly from the body cavity 20 as well as through the third opening 48 from the vent port 52a.

Referring now to FIGS. 1, 3, 5 and 10–13, a porting plate 54 is provided having a first side 56 connected to one of the flow plates, such as flow plate 36. The first side 56 of the porting plate 54 has first and second inlet passageways 58 connected to the first and second inlet ports 42 of the flow plate 36. In addition, the first side 56 has first and second outlet passageways 60 connected respectively to the first and second outlet ports 44 of the flow plate 36. The second side 62 of the porting plate 54 has a single inlet port 14 which is connected to both of the first and second inlet passageways 58 and has a single outlet port 16 connected to both of the first and second outlet passageways 60. In addition, the porting plate 54 includes a vent passageway 64 in the face 56 connected to the vent port 52 in the flow plate 36. The second side 62 of the porting plate 54 includes vent outlets 18 connected to the vent passageway 64.

A port plate 55 is positioned adjacent the second flow plate 56a and may include a vent passageway 57 in communication with the vent port 52a although preferably passageway 57 is closed.

Referring now to FIGS. 1, 3 and 5, a guide and dampener 66 is connected to the bottom of the seal container 26 and is movable in a dampening cavity 68 for dampening rapid opening movements of the container 26. A relief port 70 is provided connected to the cavity 68 and extending to the body cavity 20 for providing increasing dampening of the movement of the container 26 as the valve 10 is opened.

Various types of operating mechanisms may be used to provide the desired pressures at which the valve 10 reduces and regulates the flow between the inlet 14 and the outlet 16. Referring now to FIG. 1, a manual operating mechanism is shown. Spring means such as one or more compression springs 71 and 72 may include an upper plate 74 and a lower plate 76 positioned at opposite ends of the spring means 71 and 72. The spring means 70 and 72 act in a direction against the plunger 22 to move the seal container 26 downwardly to increase the fluid flow through the valve 10. An adjustment screw 78 acts against a ball 80 in the upper plate 74 to adjust the compression in the springs 71 and 72 for adjusting the pressures at which the valve 10 operates. Adjustment screw 78 may be manually rotated by a handle 82 to vary the compression in the springs 71 and 72. A lock lever 84 is provided for locking the adjustment screw 78 to the body 12 after the desired adjustment is made. The above described manual actuation is generally conventional. However, in the valve 10 a stop 86 is provided on the body 12 for engaging the upper plate 74 for limiting the travel of the upper plate 74 in order to limit the maxium regulated pressured as desired, and to prevent blocking valve 10 open. In addition, a stop 88 is provided on the body 12 for limiting the upward movement of the lower plate 76 and thus of the seal carrier 26 to insure that the inlet ports 42 are not uncovered during a vent operation.

An integral pilot operated bypass feature which allows the valve 10 to be operated by remote control, preferably hydraulically in order to quickly and easily move the valve to the full open position if operating conditions so require. Referring to FIGS. 1 and 5, a piston 114 is provided connected to the plunger 22 and is formed by seals 116 and exposed to fluid pressure through a control port 118. A vent line 120 is provided on the second side of the piston 114. Therefore, control pressure from any suitable valve, such as a pilot valve, may be transmitted through the port 118 against the piston 114 for quickly moving the valve 10 to the fully open position.

An important feature of the present invention relates to mounting the valve 10 onto a subplate 100 (FIGS. 1 and 5) by bolting the body 12 to the subplate 100 by bolts. The so-called "subplate mounting" has several advantages over the conventional pipe flange installation such as ease of repair and replacement. Face seals, such as O-ring seals 102, 104 and 106, surrounding and enclosing the fluid inlet 14, the fluid outlet 16, and the vent 18, respectively, are employed at the interface between the porting plate 54 and the subplate 100 to prevent leakage. However, when hydraulic pressure is generated in the inlet 14, the outlet 16, and the vent 18, the seals 102, 104 and 106 have the pressure imposed upon them to the full extremity of the seals' diameter. Consequently, a separating force is generated at the interface between the subplate 100 and the porting plate 54 and is equal to the pressure times the seal area. This separating force tends to lift the valve 10 off of the subplate 100 which results in seal extrusion and fluid leakage.

Conventional valves heretofore rely upon the connecting bolts to resist the separating force. The separating force, however, causes valve body deflection and bolt stretch particularly if the bolts have not been sufficiently tightened. In any case, the valve body deflection aspect is always present in conventional valves which is the reason why seal extrusion is inevitable at some point in the scale of rising pressure versus valve body stiffness.

The present invention provides a valve 10 which produces counteracting forces which act in a direction to hold the porting plate 54 on the subplate 100 and thus compensate for the separating forces whereby the port plate 54 will have a positive hold down force at the interface, zero deflection and no seal extrusion. The separating forces are determined by the various fluid pressures acting upon the face seal areas at the various points corresponding to the respective pressures. In the valve 10 there are a total of four ports at the interface: one primary pressure port (inlet 14), one secondary pressure port (outlet 16), and two vent ports 18 which are inconsequential.

The hydraulic hold down forces are determined by the various fluid pressures acting upon the various projected internal areas of the porting plate 54. Again, there are three pressures: the primary or inlet pressure, the secondary or outlet pressure, and the vent pressure. The primary pressure is double ported from inlet 14 through passageways 58, inlet ports 42 in the flow plate 36 and to the two hydra seats 28 and 30. Thus the combined areas of the seals 28 and 30 times the primary pressure at the inlet 14 exerts a hold down force on the second side 56 of the porting plate 54. The secondary pressure is ported through outlet 16, passages 60 in the porting plate 54, the outlet ports 44 in the flow plate 36 and to the cavity 20 of the body 12 and is contained therein by the gland seals on the piston 24, flanges, and porting plate 54. Thus the internal porting plate 54 area (less seals) times the secondary pressure produces a hold down force.

The body 12 may move relative to the subplate 100, but the porting plate 54 will not. This, of course, means there is relative movement between body 12 and porting plate 54. However, a gland seal 108 which is not subjected to separation as are face seals is provided between the porting plate 54 and the body 12 to accommodate the movement. It is also noted that any movement between flow plates 36 and 36a is accommodated by the spring loaded sliding seals.

Force is a product of pressure and area and is proportional to both. In the reducing and regulating valve 10 both the primary and secondary pressure vary, but the functional areas providing the various separating forces and hold down forces do not.

In one particular embodiment of valve 10, which has been constructed, the diameter of inlet seal 102 was one and one-half inches thereby providing an area of 1.7671 square inches acted upon by the primary pressure to create a separating force. However, each of the seals 28 and 30 had a diameter of one inch for a total area of 1.5708 square inches which were acted upon by the primary pressure to provide a hold down force. Therefore, the difference in the areas of 0.1963 square inches creates, at 3000 psi primary pressure, a separating force of 589 pounds. While the primary pressure does effect a net separating force, it is not substantial and can easily be carried by the bolts connecting the body 12 to the subplate 100.

As to the secondary or outlet pressures, the O-ring seal 104 about the outlet 16 was one and three quarters inch thereby providing an area of 2.4053 square inches acted upon by the secondary force to create a separating force. However, the side 56 of the porting plate which is three inches in diameter has a net area of 5,056 square inches (7.0686 minus 1.5708 primary minus 0.4418 vent) which is acted on by the secondary pressure to provide a hold down force. Therefore, the difference in the areas of 2.651 square inches (5.056 minus 2.4053) times the secondary pressure creates a net hold down force. At the normal operating pressures of the valve 10 with 3000 psi, primary and 1500 psi secondary, the net hold down force is 3387 pounds (3976-589).

In the worst case situation of 3000 psi primary and zero secondary, the net separating force is 589 pounds. This can be balanced out with a secondary pressure of only 222 psi. From this example, it is seen that as the secondary (regulated) pressure is increased, the net hold down force also increases.

Another important feature of the present invention is the provision of means for preventing a regulating valve from hammering or chattering. Based upon the principle that "as flow rate increases in a flow path, the ambient pressure decreases"; any movable objects in said flow path is urged to move toward the low pressure region. Such are called flow forces, are explained and identified by Bernoulli's theory and one immediately referenced to as "Bernoulli Forces".

These flow forces are commonly known to exist in all kinds of hydraulic valves. The effect or result of said flow force in practice is "hammering" or "chattering". Actually, the flow force urges the movable member toward the low pressure region which is always toward the flow shut off position. When the flow is stopped, the flow force reduces to zero; at which instant the movable member moves toward open position and flow rate thereby increases. The resulting closing and opening of the valve is manifested in hammering or chattering.

Hydra seat valves are not immune to "Bernoulli"; particularly those which are spring operated to the open position. In the past this has resulted in limiting the size of the ports 42, 42a, 44 and 44a in the flow plates 36 and 36a. Such a restriction is highly undesirable as it limits the flow capacity of the valve 10. That is, large ports in coacting with the seals 32 and 34 present a long opening interface with consequently high Bernoulli forces acting to close the ports. U.S. Pat. No. 3,018,796 is directed to one method of overcoming these forces, but that method decreased flow capacity. The present feature acts to compensate for the undesired Bernoulli forces, but do not restrict the flow capacity of the valve.

Referring now to FIG. 7, one or more holes such as holes 200a, 200, 200c and 200d are provided on the face 40 of the flow plates 36 and 36a. In one example the holes were 0.06 inches deep and 0.093 inches in diameter. As has been noted the seals 32 and 34 initially cover the primary (inlet) or high pressure ports 42 in the closed position and uncover the ports 42 when advancing to the open position. The holes 200a, 200, 200c and 200d act to generate a Bernoulli force, but in a direction to compensate for Bernoulli forces generated when the seals 32 and 34 start to open the ports 42 and 44. Thus hole 200 is positioned on the flow plate 36 to provide communication through the hole 200 between the inlet port 42 and the outlet port 44 before the seal 32 opens the inlet port 42, but is positioned to stop communication through the hole 200 as the seal 32 starts to open the inlet port 42. That is, initially, the seal 32 in the fully closed position encloses hole 200 as well as inlet port 42. As the seal 32 begins to move to the open position it encounters the hole 200 and generates a small Bernoulli force acting in a direction to close the seal 32, and more importantly as the seal 32 proceeds further to the open position it now generates a Bernoulli force that acts in a direction to open the seal 32 which compensates for the force that acts to close the seal 32 as the seal 32 encounters the inlet port 42. Thus, the seal 32 acts with the hole 200 to open the hole 200 before the seal opens the inlet port 42, and acts to close the hole 200 as the seals open the inlet port 42. The hole 200 also acts to prevent sharp pressure pulses occurring across the seal 32.

The compensation effect of hole 200 may be increased by increasing the number or diameters of the hole. Hole 200a is positioned to provide communication through the hole 200a between the inlet port 42 and the outlet port 44 before the seal 32 communicates with the outlet port 44 and is also positioned to stop communication through the hole 200a as the seal communicates with the outlet port 44. That is, hole 200a is opened before seal 32 opens the outlet port 44, but closes as seal 32 opens the outlet port 44. Holes 200c and 200d coact with the seal 34 and operate similarly to hole 200 and 200a, respectively. In actual practice it was found that the holes 200, 200a, 200c and 200d significantly allow high flow rates or pressure before hammering occurs. The provision of structure such as one or more holes to reduce hammering or chattering in regulating valves is applicable to valves other than that illustrated herein, for example the valve shown in patent application Ser. No. 06/478,125, filed Mar. 22, 1983.

In operation, the valve is manually or power operated by the manual handle 82 or 82a or by the power motor 90 to set the valve 10 at the desired regulating pressure. A fluid supply source is connected to the inlet 14, and the compression springs 71 and 72 act in a direction on the plunger 22 to move the seal container 26 to the open position shown in FIG. 1. The pressure in the body cavity 20 acts against the piston 24 to attempt to move the seal container 26 upwardly to a closed position. So long as the seal container 26 is in the position shown in FIG. 1, incoming fluid through the inlet 14 will flow through the ports 42, through the openings 28 and 30 in the container 26 and through the various passageways in the body cavity 20 through the outlet ports 44 and the outlet 16 to supply regulated fluid pressure. When the fluid pressure at the outlet 16 and in the body cavity 20 increases sufficiently to the set pressure regulation, the force on the piston 24 will act against the compression springs 71 and 72 to move the seal container 26 to the closed position shown in FIG. 5. In this position, the openings 28 and 30 are aligned with the inlet ports 42 and 42a between the flow plates 36 and 36a to block further incoming fluid pressure from the body cavity 20. Also in this position it is noted that the third opening 48 is aligned with the vent ports 52 and 52a preventing the flow of fluid in the body cavity 20 to the vent ports 52 and 52a. If the pressure at the outlet 16 increases above the regulated pressure, the regulated pressure in the body cavity 20 will increase since the outlet ports 44 are in communication at all times with the body cavity 20 and the seal carrier 26 will move further upwardly to the vent position as best seen in FIG. 3. In this position, the inlet ports 42 and 42a are still closed by the seals 32 and 34, but the vent opening 48 has moved out of alignment with the vent passageways 52 and 52a allowing fluid pressure in the body cavity to flow to the vent outlets 18.

The present invention, therefore, is well adapted to carry out the objects and attain the ends and advantages mentioned as well as others inherent therein. While a presently preferred embodiment of the invention is given for the purpose of disclosure, numerous changes in the details of construction and arrangement of parts, will readily suggest themselves to those skilled in the art and which are encompassed within the spirit of the invention and the scope of the appended claims.

What is claimed is:

1. In a pressure reducing and regulating valve having a body cavity, a plunger having a piston movable in the body and connected to a seal container having a plurality of openings having circular sliding seals therein, and an inlet, outlet, and vent port connected to the body wherein one of the circular sliding seals controls flow between the inlet and the outlet, the improvement comprising, said body including a porting plate having a flat face for mounting to a subplate, said body connected to the subplate by blots, a gland seal between the outer edge of said porting plate and said body, said porting plate includes inlet and outlet ports communicating between the subplate and said body cavity, face seals about each of the inlet and outlet port for mating with the subplate, whereby the force of the inlet and outlet pressure acting to separate the port plate from the subplate is compensated by the force of the inlet and outlet pressure in the body cavity acting in a direction to hold the port plate on the subplate, and the area of the one circular sliding seal in the seal container having substantially the same area as the area enclosed by the face seal about the inlet port.

2. The apparatus of claim 1 wherein the area of the port plate acted upon by the force created by the outlet pressure to separate the port plate from the subplate is less than the area of the port plate acted upon by the force created by the outlet pressure in the body cavity to hold the port plate on the subplate.

3. The apparatus of claim 1 wherein a seal in an opening in the container moves from a position in full communication with only the inlet port to a position in communication with both the inlet port and the outer port, and at least one hole in the flow plate positioned to provide communication through the hole between the body inlet port and the outlet port before the seal opens the inlet port and positioned to stop communication through the hole as the seal opens the inlet port.

4. The apparatus of claim 3 including, a second hole in the flow plate positioned to provide communication through the second hole between the body inlet port and the outlet port before the seal communicates with the outlet port and positioned to stop communication through the second hole as the seal communicates with the outlet port.

5. A pressure reducing and regulating valve comprising, a body having a body cavity, a plunger movable in the body, a piston connected to the plunger and exposed to pressure in the cavity, a seal container connected to the piston and movable in the body cavity, said container having first, second and third openings therethrough having first, second and third circular sliding seals in the first, second and third openings, respectively, a flow plate in said body positioned adjacent the seal container, said flow plate including first and second inlet ports for communicating with the body cavity but closed when the first and second openings in the container are aligned with said inlet ports, said flow plate including first and second outlet ports communicating with the body cavity and communicable with the first and second inlet ports, respectively, when the first and second seals are moved to overlap both the inlet and outlet ports, said flow plate having a vent port in communication with the body cavity which is closed when the third opening in the container is aligned with the vent port, a porting plate having a first side connected to said flow plate, said first side having first and second inlet passageways connected respectively to the first and second inlet ports of said flow plate, and said first side having first and second outlet passageways connected respectively to the first and second outlet ports of said flow plate, a second side of the porting plate having a single inlet port connected to both of said first and second inlet passageways and having a single outlet port connected to both of said first and second oulet passageways, said second side of the porting plate having a face for mounting to a subplate, and face seals about the single inlet port and said single outlet port for mating with the subplate whereby the force of the inlet and outlet pressure acting to separate the port plate from the subplate is compensated by the force of the inlet and outlet pressure in the body cavity acting against the flow plate and port plate to hold the port plate on the subplate.

6. The apparatus of claim 5 including a gland seal between the outer edge of said porting plate and said body.

7. The apparatus of claim 5 including, at least one hole positioned in said flow plate adjacent the inlet port to provide communication through the hole between the inlet port and an outlet port before the seal opens the inlet port and positioned to stop communication through the hole as the seal opens the inlet port.

8. The apparatus of claim 7 including, a second hole positioned in the flow plate positioned to provide communication through the second hole between a body inlet port and an outlet port before the seal communicates with the outlet port and positioned to stop communication through the second hole as the seal communicates with the outlet port.

9. A pressure reducing and regulating valve comprising, a body having a body cavity, a plunger movable in the body, a piston connected to the plunger and exposed to pressure in the cavity, a seal container connected to the piston and movable in the body cavity, said container having at least one opening therethrough and having sliding seals in each opening, a flow plate in said body positioned adjacent the seal container, said flow plate including an inlet port for communication with the body cavity but closed when the one opening is aligned with the inlet port, at least one hole positioned in the flow plate adjacent the inlet port to provide communication through the hole between the inlet port and the body cavity before the seal opens the inlet port and positioned to stop communication through the hole as the seal opens the inlet port.

* * * * *

UNITED STATES PATENT OFFICE
CERTIFICATE OF CORRECTION

Patent No. 4,554,940　　　　　　　　Dated　November 26, 1985

Inventor(s)　Ronald L. Loup

It is certified that error appears in the above-identified patent and that said Letters Patent are hereby corrected as shown below:

Column 8, line 67, delete "blots" and insert -- bolts --

Signed and Sealed this

Eighth Day of April 1986

[SEAL]

Attest:

DONALD J. QUIGG

Attesting Officer　　Commissioner of Patents and Trademarks